United States Patent
Glass

[15] 3,648,625
[45] Mar. 14, 1972

[54] AUTOMATIC PICKUP AND ENROBING APPARATUS FOR STICK-TYPE NOVELTIES

[72] Inventor: Robert Taylor Glass, 415 West 6th Street, Austin, Tex. 78701

[22] Filed: June 16, 1970

[21] Appl. No.: 46,783

[52] U.S. Cl. ..................................425/93, 62/340, 118/20, 118/23, 118/30, 425/93, 425/104, 425/114
[51] Int. Cl. ..........................................................A23g 5/00
[58] Field of Search.................107/8, 8 A, 8 B, 54 E, 54 EA, 107/70; 269/89, 157, 162, 254

[56] References Cited

UNITED STATES PATENTS

| | | | |
|---|---|---|---|
| 2,625,120 | 1/1953 | Eddy et al. | 107/8 A |
| 2,705,857 | 4/1955 | Fox et al. | 107/8 B X |
| 2,859,714 | 11/1958 | Cummings et al. | 107/8 A X |
| 2,884,875 | 5/1959 | Rasmusson | 107/8 A |
| 2,903,979 | 9/1959 | Behling | 107/70 X |
| 2,929,340 | 3/1960 | Topfer | 107/8 A |

*Primary Examiner*—James R. Boler
*Attorney*—Jones and Lockwood

[57] ABSTRACT

This disclosure relates to a pickup and enrobing apparatus which will pick up stick-type novelties from a transporting conveyor which carries the novelties in a horizontal position. The apparatus includes a pickup conveyor which has a plurality of pivotally mounted clamps which grip the novelty sticks so that the novelties can be removed from the transporting conveyor. The pickup conveyor carries the novelties through an enrobing process, and the enrobed novelties are then passed through a chiller where the coating is hardened. The novelties are released from the pickup conveyor as the conveyor emerges from the chiller unit and are concurrently subjected to an airstream so that they will fall to an output conveyor with their sticks oriented in the same direction.

17 Claims, 13 Drawing Figures

Patented March 14, 1972

INVENTOR
ROBERT TAYLOR GLASS
BY Beall and Jones
ATTORNEYS

Patented March 14, 1972 3,648,625
5 Sheets-Sheet 3
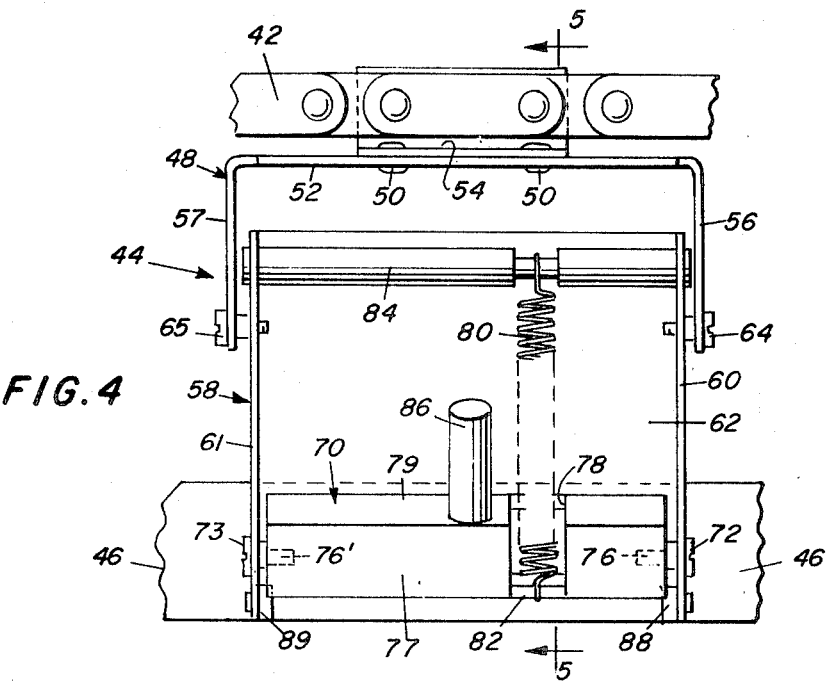
FIG. 4
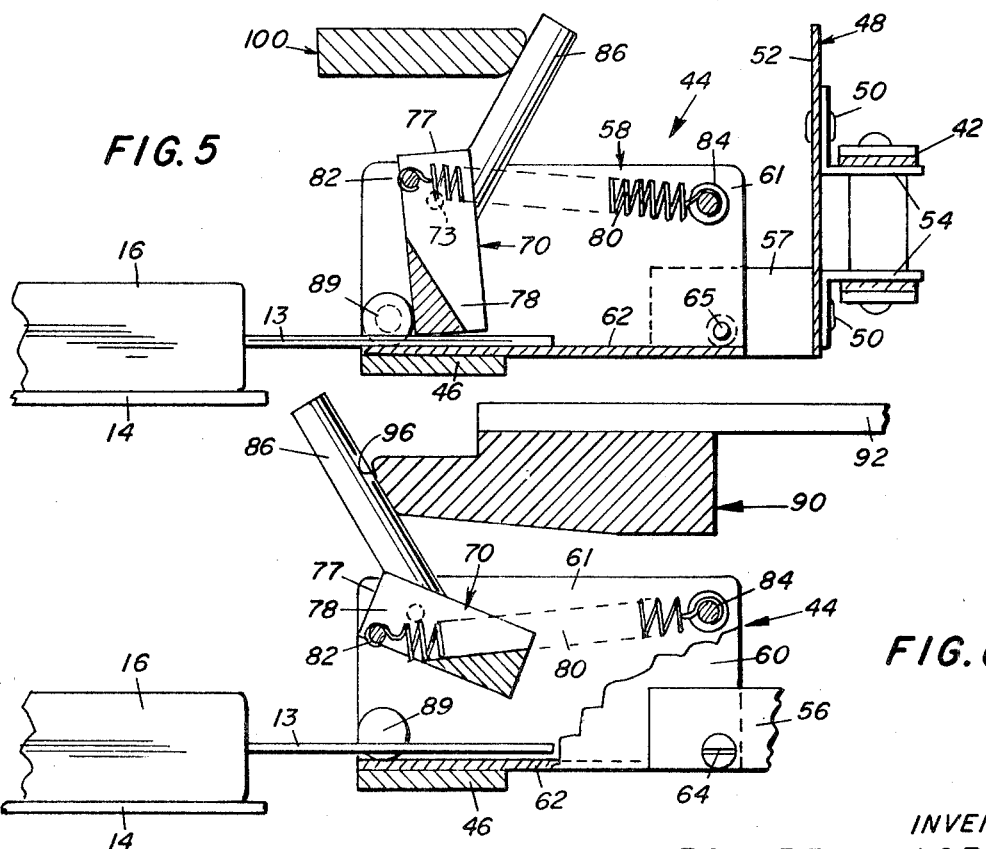
FIG. 5
FIG. 6
INVENTOR
ROBERT TAYLOR GLASS
BY Beall and Jones
ATTORNEYS

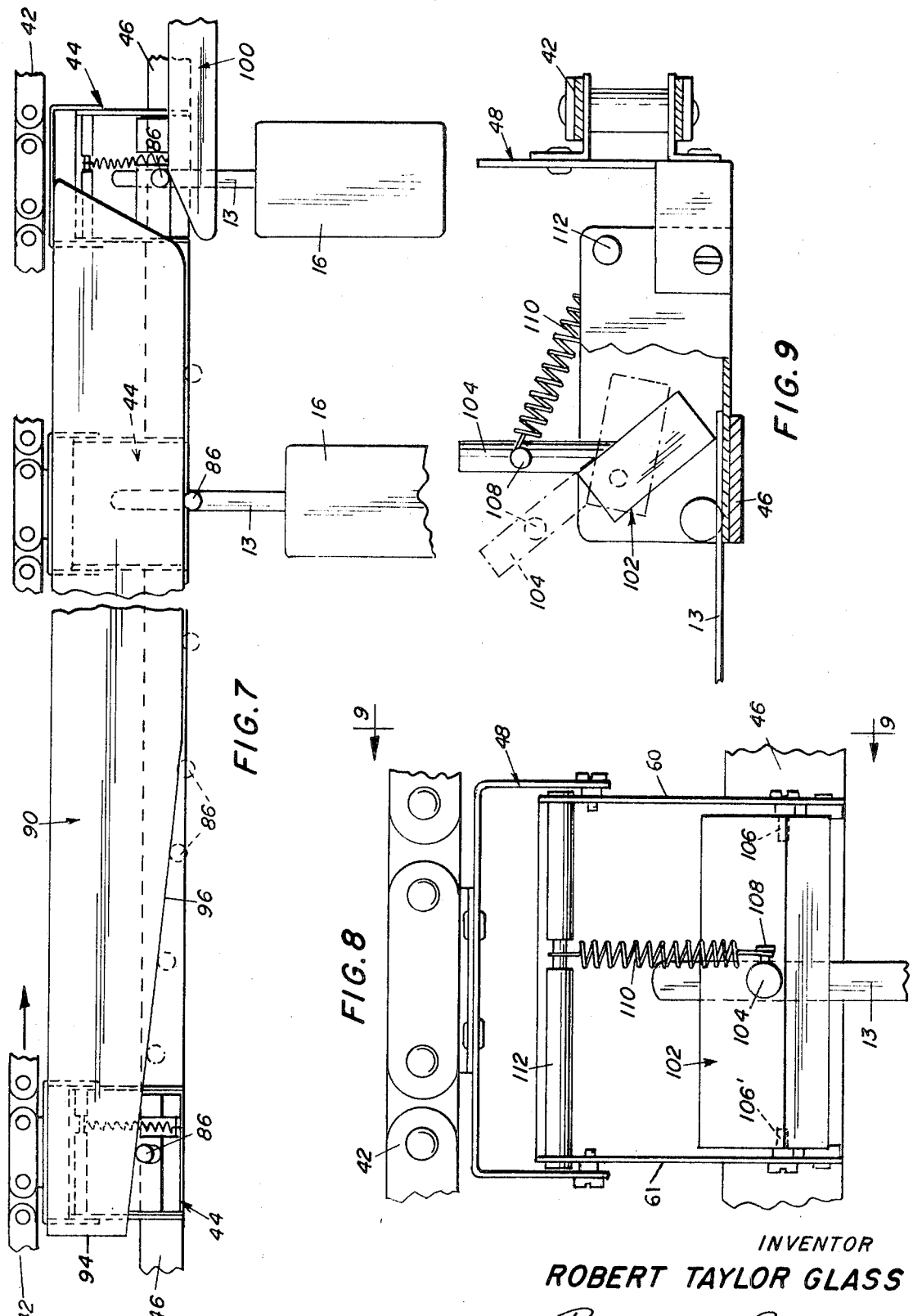

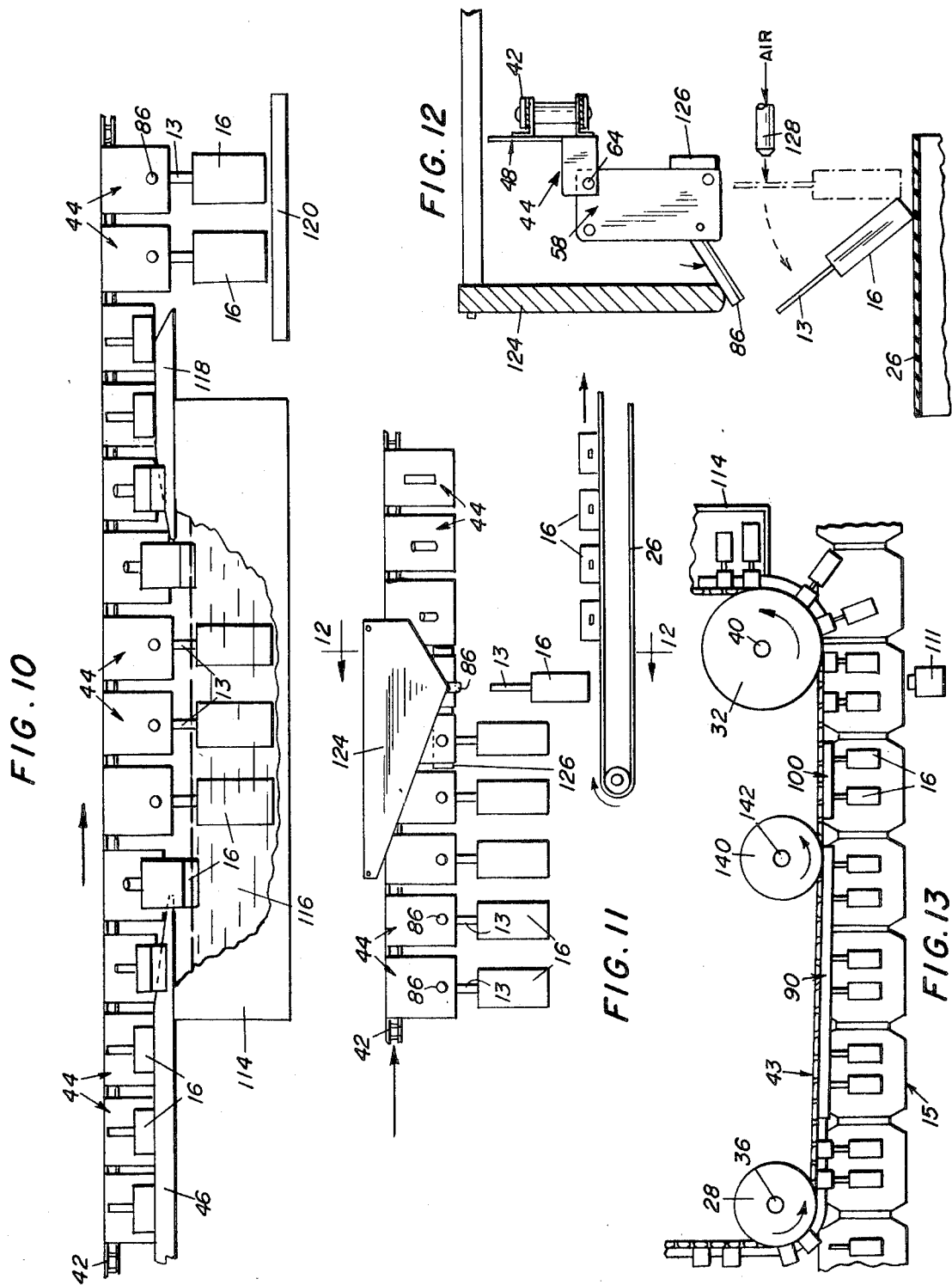

3,648,625

AUTOMATIC PICKUP AND ENROBING APPARATUS FOR STICK-TYPE NOVELTIES

BACKGROUND OF THE INVENTION

The subject invention relates to an apparatus for picking up frozen stick type novelties, such as extruded ice cream bars, from a moving conveyor which carries the novelties in a horizontal position. The pick up apparatus also provides means for enrobing the novelties in a coating fluid and transferring the enrobed novelties to an output conveyor for packaging.

In the prior art, frozen confections or novelties such as ice cream bars and the like have normally been prepared by pouring a liquid into a mold of any particular shape and then passing the mold through a freezer unit so that the confection will be solidified while still in the mold. After the confection or novelty has been solidified, it is necessary to remove it from the mold, and thus several methods and apparatuses have been devised to accomplish this function. Two examples of such devices are disclosed in my prior U.S. Pat. Nos. 2,894,652 and 2,911,212. One of the major disadvantages of these presently known apparatuses for withdrawing the frozen novelties from a mold is the necessity of providing some means to loosen the confection from the mold so that it can be withdrawn. In the presently known devices, the mold carrying the solidified confection is passed through some type of heating means so that the confection is slightly defrosted, thereby permitting it to be easily slipped from the mold. However, it was found that the confection usually had to be refrozen before it was enrobed, thus requiring an additional step. Other problems encountered when using the mold type confection makers include the fact that the molds were very expensive and that they had to be cleaned after each use, both of which added to the cost of manufacturing the confections.

Recently the art of extruding confections has been developed in order to eliminate the mold type confection making apparatuses; unfortunately, however, presently known withdrawing and enrobing devices cannot be used in conjunction with these recently developed extruding apparatuses. Such newly developed extruding devices normally have a shaped nozzle from which a semifrozen mixture can be extruded; thereafter a hot wire or blade can be passed through the extruded portion to cut off the semifrozen mixture into shaped bars. Normally, just prior to severing the bar from the extruded mixture, a stick is inserted into the portion of semifrozen mixture which is to be severed. An example of a stick inserting apparatus is disclosed in my copending U. S. Pat. application Ser. No. 758,320, for a Stick Conveyor and Inserter for Frozen Confections, filed Sept. 9, 1968, now U.S. Pat. No. 3,554,138. After the stick is inserted and the confection has been severed from the extruded mixture, the confection is disposed onto a carrying conveyor which transports the confection to a freezing unit. Generally, the confections are deposited on the transporting conveyor in a horizontal position.

With these new innovations in the confection making art, it can be seen that there exists a need for a confection pick up and enrobing apparatus which can be used in conjunction with the recently developed extruding apparatuses, since the presently known withdrawing and enrobing devices are not designed to pick up novelties which are carried in a horizontal position.

SUMMARY OF THE INVENTION

It is, therefore, an object of this invention to provide a pick up and enrobing apparatus which will pick up stick type frozen confections while the confections are being transported on a moving conveyor.

Another object of this invention is to provide a pick up and enrobing apparatus which will pick up stick type novelties while they are carried in a horizontal position.

Another object of this invention is to provide a pick up and enrobing apparatus which will remove frozen confections from a plate upon which they are extruded without the necessity of a defroster.

Another object of this invention is to provide a pick up and enrobing apparatus which will permit frozen confections to be automatically dipped into a coating fluid.

Another object of this invention is to provide a cam operated clamp for a pick up and enrobing apparatus which will permit a frozen confection to be picked up in a horizontal position and which can be pivoted to a vertical position so the confection can be dipped into a coating fluid.

Still another object of this invention is to provide a pick up and enrobing apparatus in which the coated stick type confections are dispensed from the pick up and enrobing apparatus with their sticks oriented in the same direction.

A still further object of this invention is to provide a pick up and enrobing apparatus, in combination with a confection making device, in which the confections, such as ice cream bars, are extruded, provided with sticks, and placed on a moving conveyor which carries them in a horizontal position through a freezing unit wherein the confections are hardened; thereafter the pick up and enrobing apparatus removes the confection from the moving conveyor while the confection is in a horizontal position by grasping the sticks by means of cam operated jaws, and carries the confection through a dipping process so that the confection can be enrobed and through a chiller so that the coating can be hardened. Upon emerging from the chiller, the confections are released onto an output conveyor for packaging.

These and other objects are accomplished by the present invention through the use of a pick up and enrobing apparatus which will pick up stick type novelties from a moving conveyor which carries the novelties in a horizontal position. The apparatus includes a pick up conveyor means which has a plurality of clamps disposed thereon that will grip the novelty sticks while the novelties are disposed horizontally so that the novelties can be removed from the moving conveyor and transported through an enrobing process. A guide member permits the pick up conveyor clamps to be pivoted to a vertical position so that the novelties can be dipped into a coating tank. The pick up conveyor carries the enrobed novelties through a chiller where the coating is hardened; upon emerging from the chiller the novelties are released from the pick up conveyor clamps and are simultaneously subjected to an air stream which causes the novelties to be dispensed onto an output conveyor with their sticks oriented in the same direction.

BRIEF DESCRIPTION OF THE DRAWINGS

The foregoing and additional objects, features and advantages of the invention will be apparent to those skilled in the art from the following detailed description of a preferred embodiment, taken with the accompanying drawings, in which:

FIG. 4 is a plan view of the pick up clamp carried on the pick up conveyor according to the present invention;

FIG. 5 is a cross-sectional view of the pick up clamp in its closed position as taken on line 5—5 of FIG. 4;

FIG. 6 is a side view of the pick up clamp shown in the open position;

FIG. 7 is a detailed plan view of a pick up conveyor and enrobing apparatus disclosing the clamp opening and closing cams according to the present invention;

FIG. 8 is a plan view of a modification to the pick up clamp as shown in FIG. 3 according to the present invention;

FIG. 9 is a cross section view of the modified pick up clamp as taken on line 9—9 of FIG. 8;

FIG. 10 is a side elevation view of the pick up conveyor and enrobing apparatus showing the coating tank according to the present invention;

FIG. 11 is a side elevation of the pick up conveyor and enrobing apparatus disclosing the releasing cam and the output conveyor according to the present invention;

FIG. 12 is a cross section of the pick up conveyor and enrobing apparatus as taken on line 12—12 of FIG. 11; and FIG. 13 is a fragmentary plan view of the pick up conveyor showing a modified embodiment.

DESCRIPTION OF A PREFERRED EMBODIMENT

Figure 1:
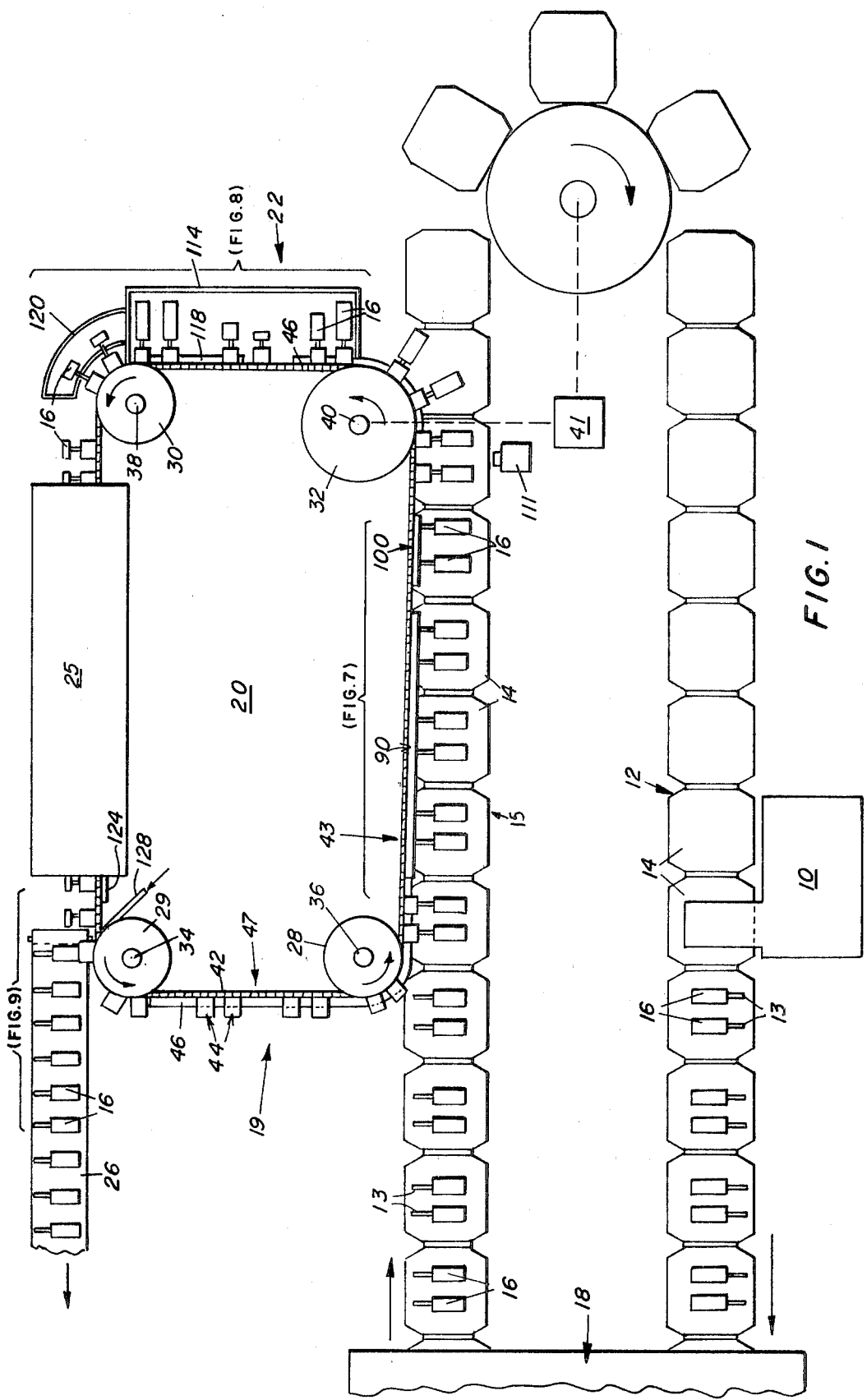
FIG. 1 is a general plan view showing the arrangement of the novelty transporting conveyor and the pick up and enrobing apparatus along with their associated freezing, chilling and dipping processes according to the present invention.

Referring more particularly to the drawings, in FIG. 1 the numeral 10 indicates a confection extruder and stick inserting apparatus similar to the one shown in my copending application identified above. The extruder apparatus is positioned near a transporting or carrying conveyor 12 so that partially frozen ice cream or other confection mixtures can be extruded from a suitable tube, nozzle or the like onto the transporting conveyor. The nozzle can be formed in any desired shape, and thus may be circular, square, or rectangular, may have diamond, heart, or animal-like shapes, etc. The confection mixture is extruded from the nozzle and is cut off by a hot wire or blade arrangement at the desired thickness of the finished bar. Normally, the extruding tube will be mounted in a vertical direction so that when a confection is cut off of the extruded portion, it will drop directly onto the transporting conveyor 12. Prior to the bar being cut from the extruded confection mixture, a stick 13 is inserted into the portion of the confection mixture to be severed.

The transporting conveyor can traverse any desired path; however, there should be at least one elongated side, and in this preferred embodiment, the transporting conveyor is an endless chain traveling about two spaced sprockets, only one of which is shown, thereby forming a conveyor with two elongated sides. The transporting conveyor carries a plurality of flat plates 14 past the extruder 10, where each plate normally receives two semifrozen extruded bars 16 which are positioned on the conveyor with their sticks 13 disposed outwardly from the side of the transporting conveyor. One end of the transporting conveyor 12 passes through a freezer unit 18 which can be of any particular type disclosed in the prior art. One such unit which is suitable is disclosed in my prior U.S. Pat. No. 2,887,855, this freezer providing a flow of sub-zero air to solidify the confection mixture.

As the carrying conveyor 12 emerges from the freezer unit 18, the frozen confections 16 are normally stuck to the conveyor plates 14. The elongated side 15 of the transporting conveyor 12 passes near a pick up conveyor and enrobing apparatus 19. The pick up conveyor 20 removes the bars from the transporting conveyor and carries them through a coating process at the enrobing apparatus generally indicated at 22 so that they can be coated with any desirable fluid such as chocolate, butterscotch or the like. After the coating process, the confections are carried by the pick up conveyor 20 through a chilling tunnel 25 where the coating is hardened. Upon emerging from the chilling tunnel, the novelties or confections are released from the pick up conveyor and fall onto an output conveyor 26 which carries the novelties to a packaging apparatus (not shown). If the coating fluid is a quick hardening type or the pick up conveyor is of such length that the coating will harden without being chilled, the chilling tunnel can be eliminated.

Turning now to a detailed consideration of the pick up conveyor 20, a plurality of sprockets, pulleys or the like 28, 29, 30 and 32 carried on vertical shafts 34, 36, 38 and 40, respectively, are positioned to form a conveyor path approximately rectangular in shape. A drive means 41 drives one of the shafts, for example, shaft 40, and an endless chain 42 is trained over the sprockets, thereby forming the conveyor. In this preferred embodiment, the drive means 41 receives its power from the transporting conveyor 12 so that the pick up conveyor 20 is synchronized with the transporting conveyor; however, other means may be provided to drive the pick up conveyor and to synchronize the movement of the two conveyors. A plurality of pick up clamps 44 are secured to the endless chain in any suitable manner and travel along the path of the chain. The clamps 44 are spaced so that on side 43 of the pick up conveyor, which is contiguous to the side 15 of the transporting conveyor, each clamp will coincide and be aligned with a particular stick of one of the novelties carried on the plates 14 of the transporting conveyor. The clamps 44 are pivotally secured to the endless chain 42 and are normally carried in a horizontal position as the chain moves in a counterclockwise direction (as viewed in FIG. 1) around the path of the conveyor. A guide bar 46, which can be a flat plate, rod, or the like, is located below the conveyor path and holds the clamp in the horizontal position. The guide 46 has suitably tapered ends which permit a gradual change in the clamp position as the clamp is pivoted between a down, or vertical position at sprocket 29 to a horizontal, or up, position where it remains until it passes around sprockets 28 and 32, at the later of which it returns to the down position. Thus, the guide bar 46 begins on side 47 of the conveyor 20 and extends around and past sprocket 32 of the conveyor 20 where the pick up conveyor 20 diverges from the transporting conveyor 12. The clamps slide along the flat upper surface of the guide 46 so that they are held in a horizontal position as the pick up conveyor 20 converges with the carrying conveyor 12 at sprocket 28. As each clamp 44 passes around the sprocket 28, a stick in one of the novelties becomes aligned with the clamp for later pick up.

In order to insert the novelty sticks into the clamps, the path of the transporting conveyor 12 and the pick up conveyor 20 gradually converge along the length of sides 15 and 43, respectively. In this particular embodiment, the sprocket 32 is larger in diameter than sprocket 28 (see FIG. 1), thereby causing the paths or runs of the pick up conveyor 20 and the carrying conveyor 12 to converge as the endless chain 42 is rotated towards the large sprocket 32. Any other suitable means may be used to cause the two conveyors to converge, such as positioning the shaft 40 closer to the conveyor 12 than shaft 36 while having sprockets 28 and 32 of the same size. After the sticks in the novelties are inserted into the clamps, the clamps are actuated and the novelties are gripped by the clamps so that they may be removed from the transporting conveyor.

Considering the pick up clamp of the present invention in more detail, it can be seen in FIGS. 2, 4, 5 and 6 that a preferred embodiment of the clamp 44, which can be made of any suitable material such as steel, aluminum, plastic or the like, has a mounting plate 48 which is fixedly secured to the endless chain 42 by a plurality of fasteners 50 such as rivets or the like. The rivets 50 extend through apertures 51 on the back portion 52 of the mounting plate 48 and through angular brackets 54 (FIG. 5) which are, in turn, secured to a link of the endless chain 42 in any suitable manner. The mounting plate 48 is carried so that the portion to which the angle brackets are secured is parallel to a vertical plane passing through the endless chain 42. The mounting plate 48 has projecting arms 56 and 57 formed integrally therewith and which are perpendicular thereto, the arms forming a clevis into which a U-shaped frame 58 is inserted. The U-shaped frame, which is formed by side walls 60 and 61 and a bottom wall 62, is pivotally mounted between the ears 56 and 57. In this preferred embodiment, the pivotal mounting consists of fasteners 64 and 65 which pass through apertures 66 and 67 in arms 56 and 57, respectively, and are threaded into respective threaded apertures 68 and 69 in the lower rear portion of the side walls 60 and 61. The fasteners 64 and 65 have unthreaded upper portions which contact the unthreaded inner surfaces of apertures 66 and 67, thereby permitting the frame to pivot with respect to the mounting plate 48. Any other suitable fastener means can be used which will permit the U-shaped frame 58 to pivot with respect to the mounting plate 48, as, for example, suitable nut, bolt and spacer assembly.

The gripping action of clamp 44 is accomplished by a clamping jaw 70 pivotally mounted in the U-shaped frame near the forward top edges of the side walls 60 and 61 by fasteners 72 and 73 which are similar to fasteners 64 and 65. Fasteners 72 and 73 extend through unthreaded apertures 74 and 75 in side walls 60 and 61 of the U-shaped frame, and the threaded portions are screwed into threaded recesses 76 and 76' in the ends of jaw 70 (FIG. 4). The jaw 70 is generally in the shape of a rectangular bar which extends across the U-shaped frame, with the threaded recesses 76 and 76' in the ends of the bar being located near the upper edge 77 (FIG. 5) of the rectangular jaw so that when the jaw is actuated to the closed position the lower edge of the jaw will be spaced above the bottom 62 of the U-shaped frame 58 a distance approximately equal to the thickness of a novelty stick. A cutout 78 (FIG. 2) is provided in the jaw 70 to permit a spring 80 to be attached to a pin 82 which is secured to the jaw in any suitable manner within the cutout and near the upper edge 77 of the jaw 70. The pin 82 is nearer edge 77 than the pivotal axis of the jaw defined by the recesses 76 and 76', and the other end of spring 80 is attached to a rod 84 extending between walls 60 and 61 located near the rear top edge of the U-shaped frame so as to provide an overcenter operation for the jaw as it is opened and closed. A handle 86 is secured to the surface 79 of the rectangular jaw 70 at approximately the center of the jaw and near the upper edge 77 to serve as a cam follower and to control the motion of the jaw. In order to prevent the spring 80 from rotating the jaw through the frame 58, a pair of stops 88 and 89 are located at the forward edge of the U-shaped frame 58 near the bottom wall, the stops extending into the space between side walls 60 and 61 to abut against jaw 70 when it is rotated to the closed position indicated in FIG. 5. The cutout 78 and the location of the pin 82 with respect to the pivotal axis of the jaw 70 permit the axis of the spring to pass through the pivotal axis of the jaw as the jaw moves so that the spring 80 is above the pivotal axis when the clamp is in the closed position (see FIG. 5) and below the pivotal axis of the jaw when the clamp is in the open position (see FIG. 6). The positioning of the axis of the spring above and below the pivoted axis of the jaw permits the spring to hold the clamp in the open or closed position after the clamp has been actuated in a particular direction.

Along side 43 of the pick up conveyor 20, an opening cam 90 (see FIGS. 6 and 7) is mounted by a cantilever member 92 which extends over the path traversed by the clamps. In this preferred embodiment, the cam is a flat plate with an initial width at end 94 of such a dimension that the handle, or cam follower, 86 of a clamp will pass in front of the cam 90 when the clamp is in the closed position. The cam has a tapered surface 96 which will contact the handle when the clamp is in the closed position. As the clamp moves along the path of the conveyor, the tapered surface of the cam pushes the handle 86 forward to pivot the jaw 70 toward its open position. When the axis of the spring 80 passes through the pivotal axis of the jaw, the clamp is snapped to its fully open position and held there. As the open clamp is moved along the path of the conveyor, (from left to right as viewed in FIG. 7), a novelty stick 13 is inserted into the clamp as the paths of the pick up conveyor and the carrying conveyor converge. The handle 86 on clamp 44 then contacts a closing cam 100 which is mounted over the path of the clamps similarly to the opening cam. The closing cam causes the handle 86 to move rearwardly, pivoting the jaw 70 so that the axis of the spring 80 will pass through the pivotal axis of the jaw 70 and the clamp will be rotated to the closed position and grip the novelty stick 13, thereby holding the novelty so that it can be removed from the transporting conveyor 12. The over-centered arrangement of the spring 80 permits the clamp to be held closed until the handle 86 is pivoted forward again and the axis of the spring 80 passes through the pivotal axis of the jaw 70 as shown in FIG. 6.

Figures 2, 3:
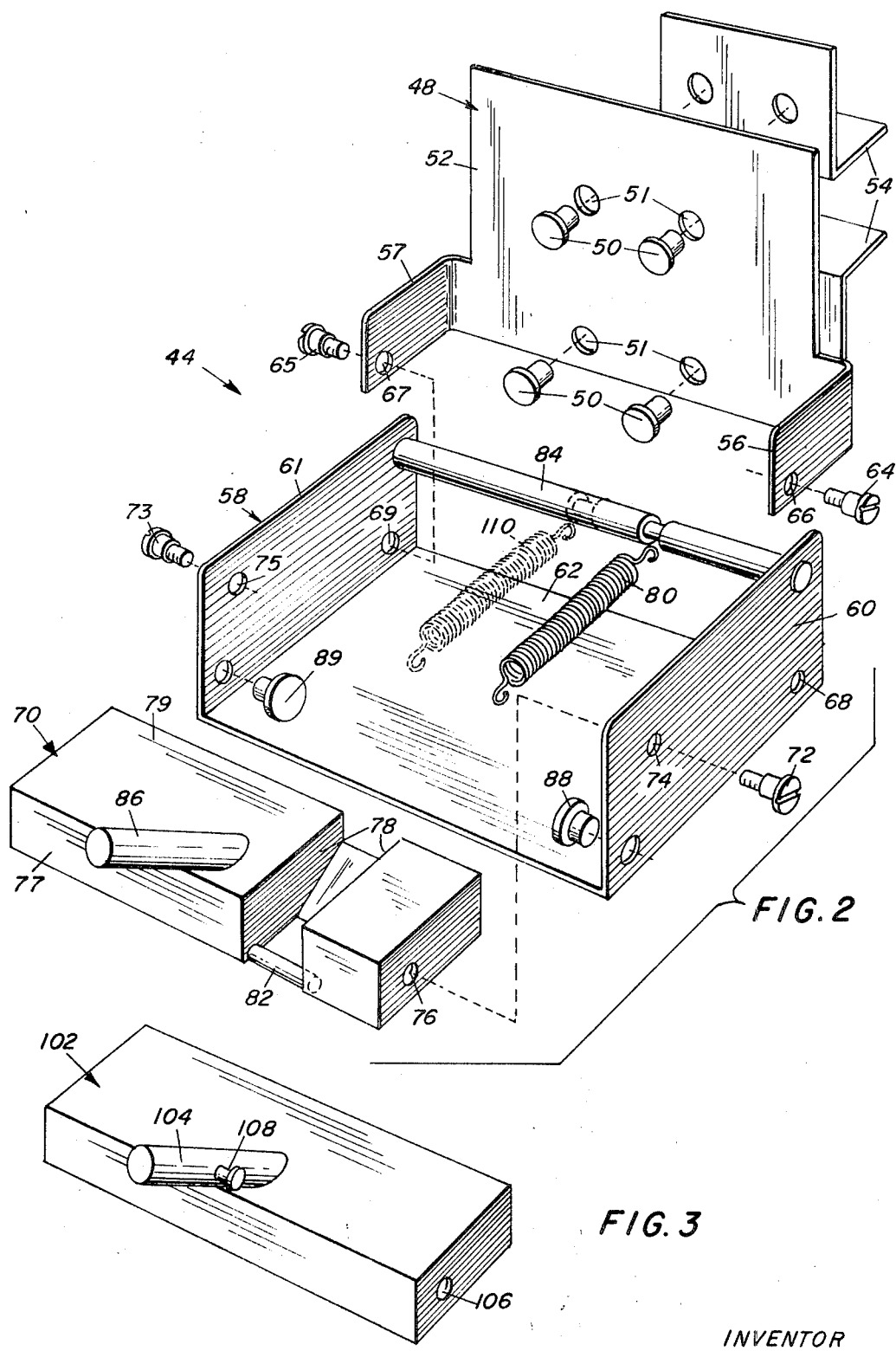
FIG. 2 is an exploded detailed perspective of a cam operated pivotal clamp which is carried on the pick up conveyor means according to the present invention.
FIG. 3 is a perspective of a modification to the clamp jaw according to the present invention.

The above preferred embodiment of the clamp can be modified as shown in FIG. 3, in which the numeral 102 indicates a solid clamp jaw with no cutout, the jaw having a handle 104 secured to the top surface. The jaw is pivotally mounted in the U-shaped frame in the same manner as the jaw 70 of the preferred embodiment, aligned threaded recesses 106 and 106' in the ends of the jaw 102 providing a pivotal axis for the jaw. A stud or pin 108 is secured to the side of the handle 104 and a spring 110, which is shown in phantom in FIG. 2 and which is seen assembled in FIGS. 8 and 9, is attached between the stud and a cross bar 112 secured between the side walls 60 and 61 of the U-shaped frame. The location of the stud 108 of this modified embodiment of the clamp causes a clockwise force, as viewed at the right of FIG. 3, to be exerted on the handle 104 so that the clamp will normally remain in the closed position; therefore, this embodiment of the clamp eliminates the necessity of having a closing cam. The modified embodiment of the clamp will remain closed until the handle 104 contacts the tapered surface 96 of the opening cam 90 and is pivoted forward so that the jaw will assume the position shown in phantom in FIG. 9. When the modified clamp has passed the opening cam 90, the spring 110 will pull the handle rearwardly (to the right in FIG. 9) so that the clamp will pivot and the jaw will be rotated forward and contact the novelty stick 13.

Continuing with the description of the pick up conveyor, as the transporting conveyor 13 emerges from the freezer unit 18, the novelties are carried horizontally on the plates 14 with the sticks 13 extending toward the edge of the conveyor so that they can be grasped by clamps 44. Guide 46 preferably is located slightly above the surface of the plates 14 so that it will support the clamps 44 above the surface of the plates. Because of the thickness of the novelties, the sticks 13 are also spaced above the surface of plates 14, and thus above the bottom portion 62 of the U-shaped frame 44; therefore, as the paths of the conveyors merge, the sticks will be inserted into the clamps. IN this preferred embodiment and in the normal situation, the thickness of the novelties themselves is sufficient to insure that the sticks will be inserted into the clamps; however, if the novelty is too thin, other means can be used to insure that the stick is above the bottom portion 62 of the U-shaped frame. For example, the plates 14 on the transporting conveyor can be tilted so that the sticks are disposed upwardly, the relative heights of the conveyors can be varied, etc. If desired, a tapping mechanism 111 as shown in FIG. 1 located next to the transporting conveyor after closing cam 100 may be provided to strike the plates 14 of the transporting conveyor to release the novelties which may be adhering to the plates after the conveyor emerges from the freezer unit 18.

The clamps 44 are carried in their horizontal positions by guide 46, and after the clamp has been actuated to grip the novelty, a vertical rise in the position of the guide 46 will cause the novelties 16 to be lifted a slight distance off of the carrying conveyor 12 since the novelties have previously been loosened from the plate 14 by the taper 111.

The pick up conveyor 20 continues along the path defined by the four sprockets and diverges from the carrying conveyor 12 when the chain 42 passes around the sprocket 32. As the clamps move along the conveyor path around sprocket 32, the guide bar 46 is terminated (see FIGS. 1 and 10) so that the U-shaped frames 58 of the clamps 44 will pivot to a vertical position about the axis defined by fasteners 64 and 65, which secure the U-shaped frame 58 to the mounting plate 48. A coating or dipping tank 114 filled with any desirable material such as chocolate, butterscotch or the like receives the novelties as the clamps 44 are pivoted and the novelties are moved to a vertical position. The pick up conveyor pulls the novelties through the dipping tank until the clamp 44 engages a second guide 118 (FIG. 10) which causes the clamps to again resume the horizontal position for a relatively short distance so that the novelties will be lifted out of the coating tank 114. The guide bar 118 is then terminated, and the clamps 44 are again pivoted to the vertical position so that any excess coating fluid or material can be caught in a drip pan 120 located below the path of the conveyor 20. The guide 118 has tapered ends similar to the guide 46.

Pick up conveyor 20 continues as shown in FIG. 1 through the chilling tunnel 25 so that the coating applied to the novelties in the coating tank can be hardened. Each clamp remains in the vertical position as the conveyor passes through the chilling tunnel; as the conveyor emerges from the tunnel, the handle 86 of each conveyor clamp contacts a releasing cam 124 which forces the handle 86 downwardly so that the clamp jaw is rotated to the open position, thereby releasing the novelty from the clamp and permitting it to fall downwardly towards output conveyor 26 (see FIGS. 11 and 12). A back guide 126 is provided on the pick up conveyor when the clamps are rotated to the vertical position to prevent the clamps from swinging back and forth. As the novelty is released from the pick up conveyor, it is subjected to an air stream from an appropriately placed nozzle 128 so that the novelties will fall into the output conveyor with their sticks oriented in the same direction. The nozzle 128 may be located on either side of the path of the pick up conveyor, but in this preferred embodiment the nozzle 128 is located in such a way that the air stream causes the novelties to be rotated so that the sticks are oriented outwardly as shown in FIG. 12. The output conveyor then carries the similarly oriented novelties to a packaging apparatus.

A modified embodiment of the pick up conveyor 20 is illustrated in FIG. 13. As described above, sprockets 28 and 32 which are carried on vertical shafts 36 and 40, respectively, are positioned to form one side 43 of the pick up conveyor path. The side 43 of the pick up conveyor is contiguous to the side 15 of the transporting conveyor so that each clamp 44 will coincide and be aligned with a particular stick of one of the novelties carried on plates 14 of the transporting conveyor. A sprocket 140 carried on shaft 142 is located between sprockets 28 and 32 at a point just prior to the beginning of closing cam 100. The size of the sprocket 140 or the position of the shaft 142 is such that the path of the pick up conveyor converges with the path of the transporting conveyor 12 between sprockets 28 and 140, and the portion of the path of the pick up conveyor 20 between sprockets 140 and 32 is parallel to the path of transporting conveyor 12. In this modified embodiment, the sticks 13 in the novelties 16 are inserted into the open clamps 44 as the paths of the two conveyors converge, and prior to the closing of the clamps 44, the paths of the conveyors will be parallel so that the novelties are perpendicular to the clamps as they are closed.

It can be seen from the above description and the drawings that this pick up and enrobing apparatus provides a mechanism which will pick up frozen stick type novelties which are transported on a moving conveyor while in a horizontal position. The pick up and enrobing apparatus also provide a means for removing the frozen confections from the transporting conveyor without the necessity of using a defroster and provides means for automatically dipping the frozen confections into a coating fluid. The pick up and enrobing apparatus of the present invention provides a cam operated clamp which will grip a frozen novelty while in the horizontal position and will subsequently pivot to a vertical position so the confection can be dipped into a coating fluid. The present invention also provides means to orient the novelties which are dispensed from the pick up and enrobing apparatus so that their sticks are disposed in the same direction.

The described embodiment can be modified in numerous ways, as will be apparent from the foregoing. For example, it is within the skill of the art to vary the material from which the device is made, to modify the cam arrangement for the opening and closing of the novelty holding clamps, to eliminate the opening cam 90 in the preferred embodiment since the releasing cam 124 opens the clamps when the novelties are released, or to provide a pulley and belt arrangement rather than the sprocket and chain as disclosed in the preferred embodiment. However, these and other variations and changes can be made in the invention as above described and illustrated without departing from the true spirit and scope thereof as defined in the following claims.

What is claimed is:

1. A pick up and enrobing apparatus for receiving horizontally disposed stick mounted novelties and coating said novelties comprising:
    a. first conveyor means for carrying said novelties in a horizontal position;
    b. second conveyor means contiguous to said first conveyor means, said second conveyor means comprising four spaced sprockets carried on corresponding support shafts and defining an approximately rectangular area, one side of said rectangle being contiguous to said first conveyor means, an endless chain encircling said sprockets and means for driving said support shafts and their sprockets thereon;
    c. means for converging the paths of said first and second conveyor means;
    d. pivotal clamp means secured to said endless chain of said second conveyor means, said clamp means adapted to grip the stick of the stick mounted novelties and remove said novelties from said first conveyor means;
    e. first guide means adapted to position said pivotal clamp means to a horizontal position so that the sticks of said horizontally disposed novelties are inserted into said clamp means as said first and second conveyor means converge;
    f. cam means for actuating said clamp means so that said clamp means will grip and release said novelties at preselected locations; and
    g. enrobing means associated with said second conveyor means for coating said novelties.

2. The apparatus of claim 1, wherein said means for converging the paths of said first and second conveyor means includes an enlarged sprocket carried on one of said support shafts on said side of said second conveyor means contiguous to said first conveyor means so that the peripheral path defined by the chain of said second conveyor means will converge with the path of the first conveyor means.

3. The apparatus of claim 1, wherein said means for converging the paths of said first and second conveyor means includes:
    a. a fifth sprocket carried on a support shaft located on the side of said second conveyor means contiguous to said first conveyor means and positioned in such a way that the peripheral path defined by the chain of said second conveyor means will converge with the path of the first conveyor means, said fifth sprocket being further located prior to the cam means which actuates the clamp means to grip said novelties.

4. A pick up and enrobing apparatus for receiving horizontally disposed stick mounted novelties and coating said novelties comprising:
    a. first conveyor means for carrying said novelties in a horizontal position;
    b. second conveyor means contiguous to said first conveyor means;
    c. means for converging the paths of said first and second conveyor means;
    d. pivotal clamp means secured to said second conveyor means, said clamp means adapted to grip the sticks of said stick mounted novelties and remove said novelties from said first conveyor means;
    e. first guide means adapted to position said pivotal clamp means to a horizontal position so that the sticks of the horizontally disposed novelties are inserted into said clamp means as said first and second conveyor means converge;
    f. enrobing means associated with said second conveyor means for coating said novelties, said enrobing means including a coating tank, through which said novelties are passed, said first guide means terminating adjacent one end of said coating tank thereby permitting said clamp means to pivot to a vertical position so that said novelties can be coated, and second guide means adjacent said coating tank for pivoting said clamp means to a horizontal position near the opposite end of said coating tank, said second guide means subsequently terminating and permitting said clamp means to return to a vertical position;

g. chiller means associated with said second conveyor for hardening the coating applied to said novelties;

h. means for receiving said novelties as said novelties are released from said clamping means; and i. a fluid stream associated with said second conveyor means to orient said stick mounted novelties in one direction upon their release from said clamp means.

5. A pick up and enrobing apparatus for receiving horizontally disposed stick mounted novelties and coating said novelties comprising:

a. first conveyor means for carrying said novelties in a horizontal position;

b. second conveyor means contiguous to said first conveyor means;

c. means for converging the paths of said first and second conveying means;

d. pivotal clamp means secured to said second conveying means, said pivotal clamp means including;
  1. a mounting plate secured to said second conveying means;
  2. a U-shaped frame pivotally mounted adjacent its rear edge on said mounting plate;
  3. clamping jaw means pivotally mounted within and near the forward edge of said U-shaped frame and being movable about an axis through said pivotal mounting;
  4. spring means secured to said jaw and mounted in said U-shaped frame for actuating said jaw; and
  5. stop means for preventing said spring means from rotating said clamping jaw past said forward edge of said frame e. first guide means adapted to position said pivotal clamp means to a horizontal position so that the sticks on said horizontally disposed stick mounted novelties are inserted into said clamp means as said first and second conveyor means converge;

f. cam means for actuating said clamp means so that said clamp means will grip and release said novelties at preselected locations; and g. enrobing means associated with said second conveyor means for coating said novelties.

6. The apparatus of claim 5, wherein said clamping jaw means has a cutout therein and a cam follower means secured to its top portion, said spring means having an axis therein and being secured to said jaw above the pivotal axis of said jaw, said cutout in said clamping jaw permitting said axis of said spring means to be located above said pivotal axis of said jaw when the clamp is in the closed position and below the pivotal axis of said clamp when the jaw is in the open position.

7. The apparatus of claim 5, wherein said clamping jaw has a cam following means secured to the top edge and said spring means is secured to said cam follower means above the pivotal axis of said jaw, so that said clamp remains in the closed position.

8. The apparatus of claim 6, wherein said cam means includes:

a. an opening cam located on the side of said second conveyor means which is contiguous to said first conveyor means, said opening cam being adapted to engage said cam follower of the clamp means and pivot the follower forward, causing the axis of said spring means to pass through the pivotal axis of said jaw to a position below the axis of said jaw, whereby the clamp remains in the open position;

b. a closing cam for engaging the cam follower of each clamp so that the cam follower is moved rearwardly, causing the axis of the spring to pass through the pivotal axis of the jaw to a position above the pivotal axis of the jaw, whereby the clamp will remain in the closed position; and c. a releasing cam which opens the clamp means by engaging the cam follower of the clamp means so that the novelties carried by the clamp means can be released from the pick up means.

9. The apparatus of claim 7, wherein said cam means includes:

a. an opening cam adapted to engage the cam follower of the clamp means and pivot the follower forward, causing the axis of said spring means to pass through the pivotal axis of said jaw to a position below the axis of the jaw, whereby the clamp remains in the open position; and b. a releasing cam which opens the clamp means by engaging the cam follower so that the novelty carried in the clamp means will be released from the pick up means.

10. A novelty making apparatus comprising:

a. means for transporting said novelties while disposed in a horizontal position;

b. means for extruding said novelties onto said transporting means;

c. means for inserting sticks into said novelties as said novelties are being extruded onto said transporting means;

d. means for solidifying said novelties which are carried on said transporting means;

e. pick up and enrobing means for removing the novelties from said transporting means while said novelties are disposed in a horizontal position, coating said novelties with a fluid, and releasing said novelties after they have been coated;

f. means associated with said pick up and enrobing means for hardening the coating applied to said novelties; and g. means for orienting said novelties so that their sticks are disposed in the same direction as said novelties are released from said pick up and enrobing means.

11. The apparatus of claim 10, wherein said transporting means includes a plurality of smooth plates which receive the novelties from said extruding means.

12. The apparatus of claim 11, further including a tapping mechanism for striking said plates on said transporting means to release the novelties so they can be picked up by said pick up and enrobing means, said novelties adhering to said plates after emerging from said solidifying means.

13. A pick up and enrobing apparatus adapted for use with stick mounted novelties presenting their sticks in a generally horizontally oriented attitude comprising:

a. an enrobing means for coating said novelties;

b. a pivotal clamp means for picking up said horizontally disposed novelties by their sticks, said clamp means comprising:
  1. a mounting plate;
  2. a U-shaped frame pivotally mounted adjacent its rear edge on said mounting plate;
  3. a clamping jaw pivotally mounted within and near the forward edge of said U-shaped frame and being movable about an axis through said pivotal mounting;
  4. spring means secured to said jaw and mounted in said U-shaped frame for selectively holding said jaw in an open and closed position; and
  5. stop means for preventing said spring means from rotating said jaw means past the forward edge of said frame;

c. means for carrying said pivotal clamp means and transporting said picked up novelties to and through said enrobing means for coating; and d. means for releasing said novelties from said clamp means after said novelties have been coated.

14. The apparatus of claim 13 wherein said carrying means includes:

a. a conveyor means having said clamp means secured thereto;

b. guide means adapted to position said pivotal clamp means in a horizontal position when picking up said horizontally disposed novelties and permitting said clamp means to pivot to a vertical position for releasing said novelties;
c. first cam means for closing said clamp means to grip said horizontally disposed novelties while said clamp means is in a horizontal position; and
d. second cam means for opening said clamp means to release said novelties while said clamp means is in the vertical position.

15. A clamping device carried on a first moving conveyor for picking up horizontally disposed stick mounted novelties from a second moving conveyor comprising:
a. a mounting plate secured to said first moving conveyor;
b. a U-shaped frame pivotally mounted adjacent its rear edge to said mounting plate;
c. clamping jaw means pivotally mounted within and near the forward edge of said U-shaped frame and being movable about a pivotal axis;
d. spring means secured to said clamping jaw and mounted in said U-shaped frame for actuating said jaw; and
e. stop means for preventing said spring means from rotating said jaw past the forward edge of said frame.

16. The clamping device of claim 15, wherein said clamping jaw has a cutout therein and a cam follower means secured thereto, said spring means having an axis and being secured to said jaw above the pivotal axis of said jaw, said cutout in said clamping jaw permitting said axis of said spring means to be located above said pivotal axis of said jaw when the clamp is in the closed position and below the pivotal axis of said clamp when the jaw is in the open position.

17. The clamping device of claim 15, wherein said clamping jaw has a cam following means secured thereto, said spring means is secured to said cam follower means above the pivotal axis of said jaw, so that said clamp is biased in the closed position.

* * * * *